US010288521B2

(12) United States Patent
De Ponte et al.

(10) Patent No.: US 10,288,521 B2
(45) Date of Patent: May 14, 2019

(54) FORCE AND MOMEMENT BALANCE AND SUPPORT THEREFOR

(71) Applicant: University of Johannesburg, Johannesburg (ZA)

(72) Inventors: Jules David De Ponte, Johannesburg (ZA); Frederik Francois Pieterse, Johannesburg (ZA)

(73) Assignee: UNIVERSITY OF JOHANNESBURG, Johannesburg (ZA)

( * ) Notice: Subject to any disclaimer, the term of this patent is extended or adjusted under 35 U.S.C. 154(b) by 3 days.

(21) Appl. No.: 15/311,150

(22) PCT Filed: May 13, 2015

(86) PCT No.: PCT/IB2015/053527
§ 371 (c)(1),
(2) Date: Nov. 14, 2016

(87) PCT Pub. No.: WO2015/173748
PCT Pub. Date: Nov. 19, 2015

(65) Prior Publication Data
US 2017/0082520 A1    Mar. 23, 2017

(30) Foreign Application Priority Data

May 14, 2014   (ZA) ................. 2014/03481

(51) Int. Cl.
*G01L 1/26* (2006.01)
*G01M 9/06* (2006.01)
*G01D 5/353* (2006.01)

(52) U.S. Cl.
CPC ........ *G01M 9/062* (2013.01); *G01D 5/35354* (2013.01); *G01L 1/26* (2013.01)

(58) Field of Classification Search
CPC .......... G01M 9/04; G01M 9/02; G01M 9/062; G01M 9/06; G01M 9/065; G01L 1/26
(Continued)

(56) References Cited

U.S. PATENT DOCUMENTS 2,448,528 A * 9/1948 Heuver ................. G01M 9/062
73/147
2,490,342 A * 12/1949 Essington .......... G09B 19/0076
434/260
(Continued)

FOREIGN PATENT DOCUMENTS

FR    2490342 A1    3/1982

*Primary Examiner* — Natalie Huls
*Assistant Examiner* — Mohammed E Keramet-Amircolai
(74) *Attorney, Agent, or Firm* — Fay Sharpe LLP

(57) ABSTRACT

This invention relates to a force and moment balance (1) including a support (9) therefor and more specifically, but not exclusively, to a force and moment balance (1) and a support (9) therefor for a wind tunnel. Force and moment balances are known in the art and are typically used in wind tunnels to measure the force and moment loads on a model in the wind tunnel. A problem with current balances is that there is inherent vertical movement associated with horizontal force. According to the invention, the balance (1) has a fixed end (3) and a movable end (6) with a number of supports (9) between the fixed end (3) and the movable end (6). Each support (9) includes compensation means to compensate for resultant movements caused by lateral movement of the movable end (6) relative to the fixed end (3).

16 Claims, 4 Drawing Sheets

(58) Field of Classification Search
USPC .......................................................... 73/147
See application file for complete search history.

(56) References Cited

U.S. PATENT DOCUMENTS

| | | | | |
|---|---|---|---|---|
| 3,159,027 A * | 12/1964 | Curry | .................... | G01M 9/062 |
| | | | | 73/147 |
| 4,938,058 A * | 7/1990 | Girard | ..................... | G01M 9/04 |
| | | | | 73/147 |
| 2012/0144911 A1* | 6/2012 | Moliere | ................ | G01M 9/065 |
| | | | | 73/147 |
| 2012/0216631 A1* | 8/2012 | Huhnd | .................. | G01M 9/062 |
| | | | | 73/862.69 |
| 2013/0239670 A1* | 9/2013 | Meis | ....................... | G01M 9/04 |
| | | | | 73/118.03 |

* cited by examiner

FORCE AND MOMEMENT BALANCE AND SUPPORT THEREFOR

This application claims priority to PCT Patent Application No. PCT/IB2015/173748, filed May 13, 2015, which claims priority to South African Patent Application No. 2014/03481 filed May 14, 2014.

FIELD OF THE INVENTION

This invention relates to a force and moment balance including a support therefor and more specifically, but not exclusively, to a force and moment balance and a support therefor for a wind tunnel.

BACKGROUND TO THE INVENTION

Force and moment balances are known in the art and are typically used in wind tunnels to measure the force and moment loads on a model in the wind tunnel. In general, force and moment balances may be used in any application where the forces and moments need to be measured. An application of the force and moment balance is to measure the forces and moments as a result of using cutting tools for machining raw material. Most balances make use of electric strain gauges to measure deformation of parts thereof. The deformation may be electrically measured and forces and moments may be mathematically derived therefrom.

A problem with current balances is that there is inherent vertical movement (shown as A in FIG. 1) associated with an horizontal force (shown as B in FIG. 1). This is undesirable as it increases calibration time and complexity. Calibration provides a means to relate input forces and moments to sensor outputs, and is needed to measure accurately.

OBJECT OF THE INVENTION

It is accordingly an object of the current invention to provide a force and moment balance and support which, at least partially, alleviate the problem associated with the prior art.

SUMMARY OF THE INVENTION

In accordance with the invention there is provided a support for a force and moment balance comprising:
  a first end and a second end;
  a support structure between the ends;
  the support structure including:
    a first support member extending from the first end;
    a second support member extending from the second end; and
    an intermediate member between the first and second members; and
    biasing means for biasing the members such that lateral movement of the second end causes partially opposing relative longitudinal movement between the first and intermediate members.

The first end may be fixed, the second end may be movable.

The opposing relative movement between the first support member and the intermediate member neutralizes relative longitudinal movement between the movable end and the fixed end caused by lateral movement of the second end.

The opposing relative movement is opposite and equal.

The members may be integrally formed wherein the relative longitudinal movement between the first support member and the intermediate member and biasing between the members are caused by flexing of the members.

The members and ends may be integrally formed.

The members are shaped and sized such that lateral movement of the second end causes flexing of the members; the flexing of the members causes proportionally opposing longitudinal movement of portions of thereof.

Lateral movement of the movable end causes movement of the first support member relative to the fixed end and movement of the intermediate member relative to the first member.

In accordance with a second aspect of the invention there is provided a force and moment balance comprising:
  a fixed end and a movable end;
  a number of supports between the fixed and movable ends;
  each support including compensation means compensating for resultant movements caused by lateral movement of the movable end relative to the fixed.

The force and moment balance may include a support for a force and moment balance as described above.

The force and moment balance may be made as a single piece, or from multiple pieces.

The compensation means may be in the form of the support described above.

The fixed end may include a base and mounting plate.

The movable end may include a base and mounting plate.

The balance may include measurement means for measuring movement of the movable end.

The measurement means may include optical fiber measurement means.

The optical fibers may include a selective wavelength filter or reflector.

The filter or reflector may be a Bragg reflector. The Bragg reflector may be Bragg grating.

The measurement means may measure the movement of the movable end relative to the fixed end.

The deformation of optical fibers may be used to measure the movement of the movable end relative to the fixed end.

BRIEF DESCRIPTION OF THE DRAWINGS

Embodiments of the invention are described below, by way of example only, with reference to the drawings in which.

DETAILED DESCRIPTION OF THE DRAWINGS

Figure 1:
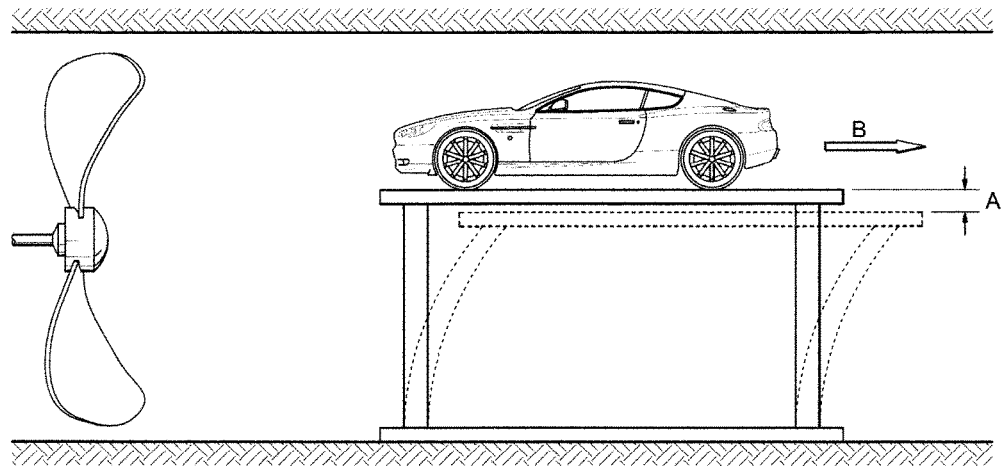
FIG. 1 is a schematic representation of a wind tunnel with a prior art balance.
Figure 2:
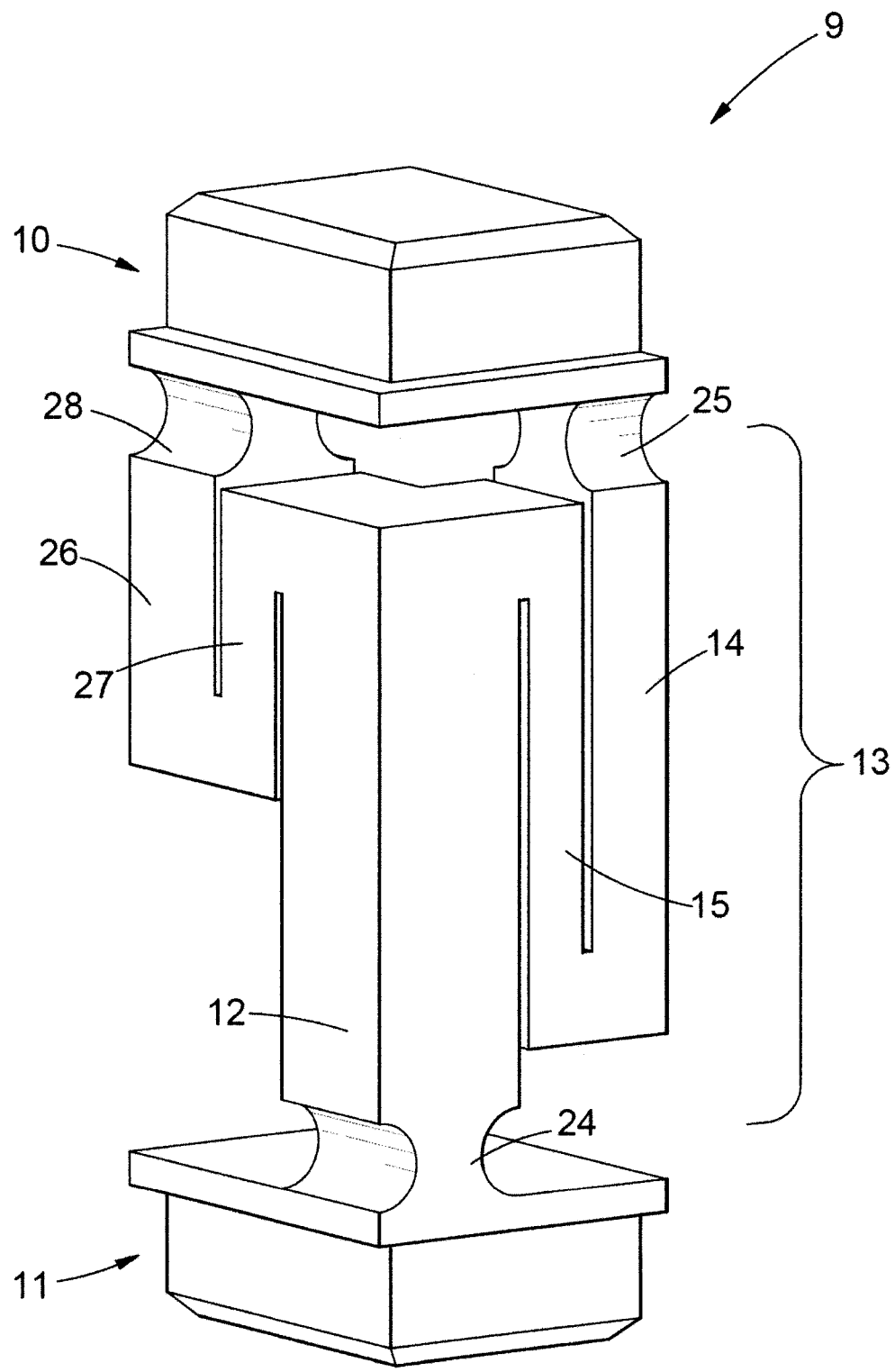
FIG. 2 is a schematic perspective view of a support for a force and moment balance.
Figure 3:
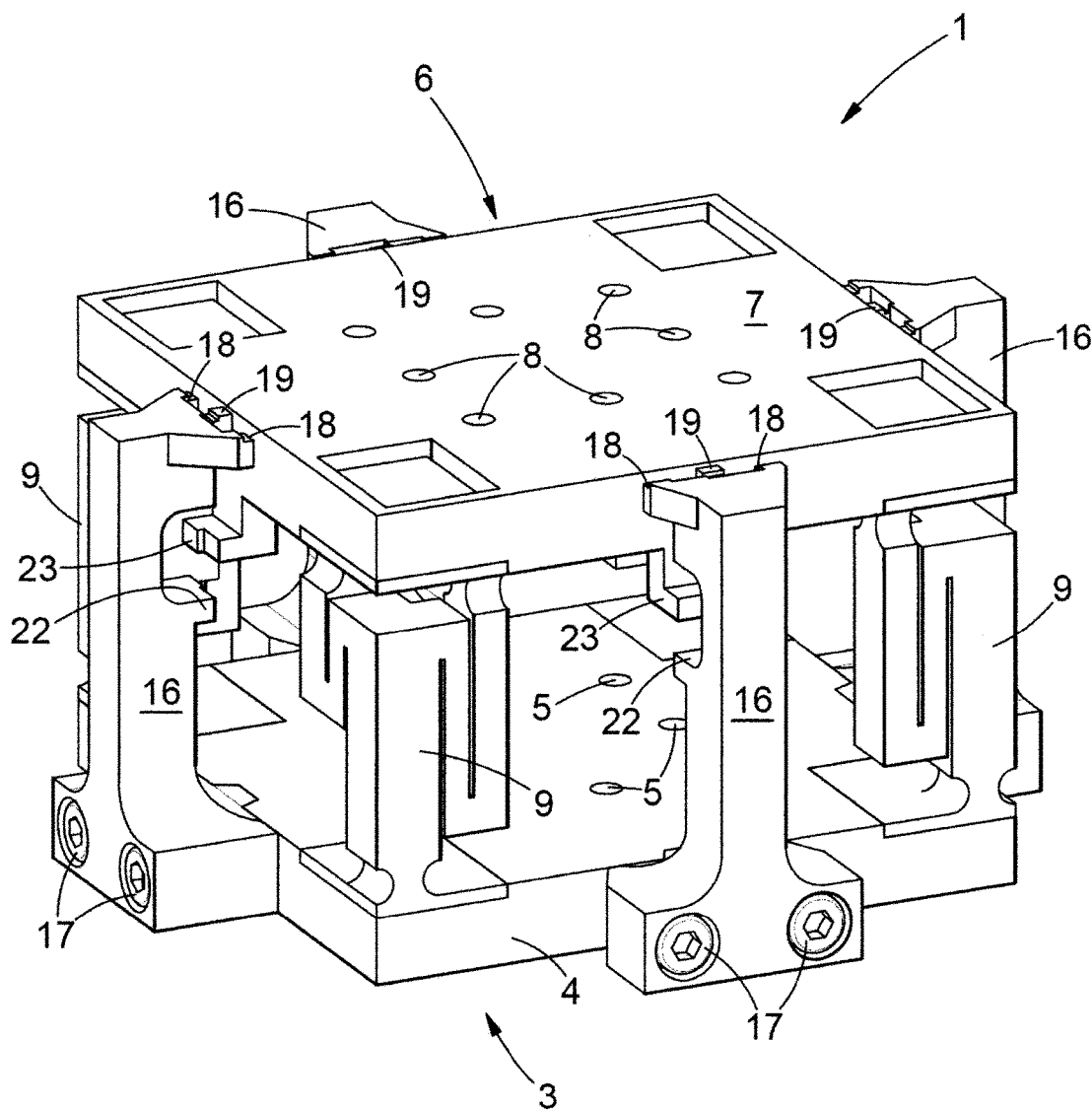
FIG. 3 is a schematic perspective view of a force and moment balance.
Figure 4:
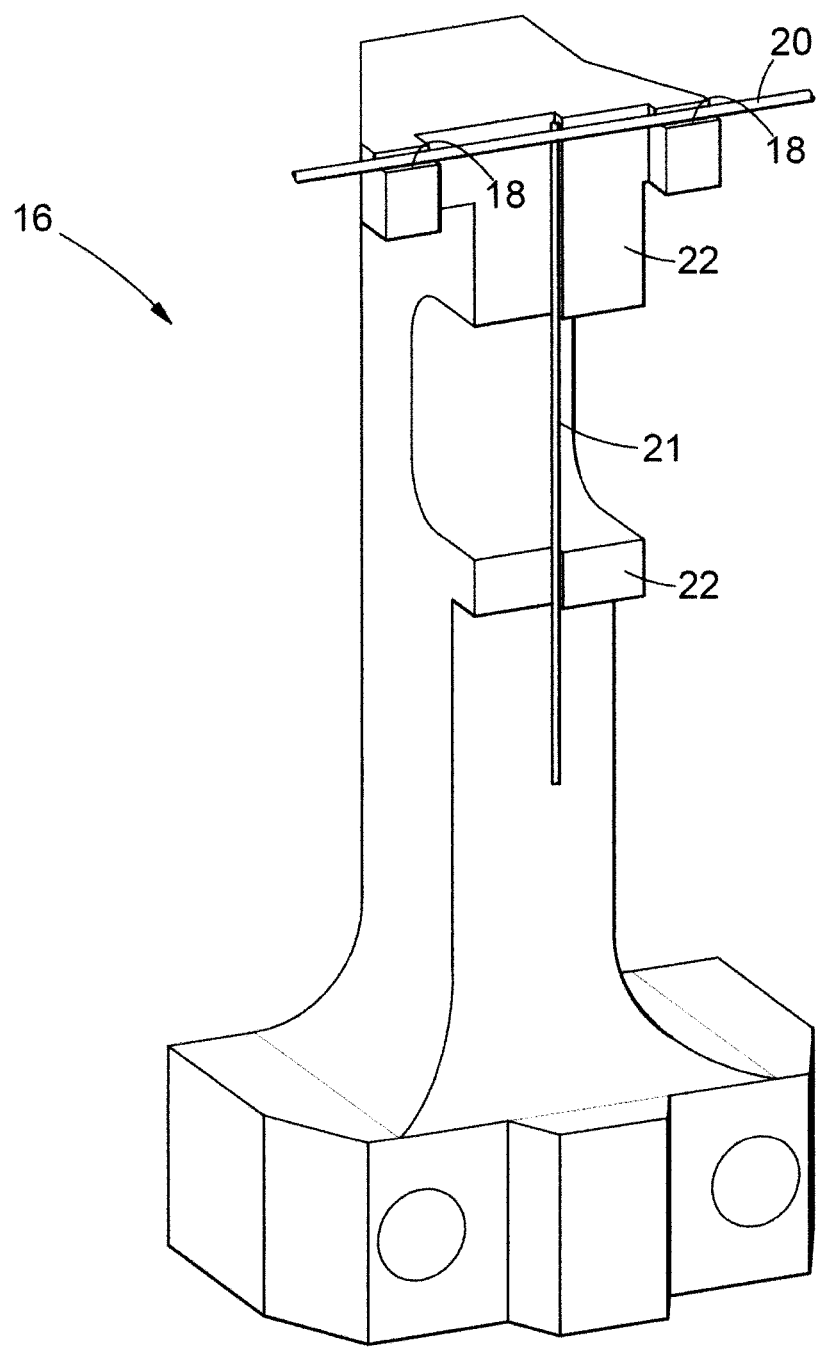
FIG. 4 is a schematic perspective view of an upright of a force and moment balance.

With reference to the drawings, in which like features are indicated by like numerals, a force and moment balance is generally indicated by reference numeral 1.

The balance 1 has a fixed end 3 and a movable end 6 with a number of supports 9 between the fixed end 3 and the movable end 6. Each support 9 includes compensation means (generally indicated by reference numeral 13) to compensate for resultant movements caused by lateral movement of the movable end 6 relative to the fixed end 3.

The balance 1 includes a base at the fixed end, in the form of mounting plate 4 for mounting the balance 1 and fixing the fixed end 3 to a structure, typically a wind tunnel. The balance 1 further includes a mounting plate 7 at the movable end 6 thereof, typically for mounting a specimen (not shown) for measuring force and moments on the specimen. The mounting plates (4 and 7) include mounting holes (5 and 8) for mounting the balance 1 and securing a specimen for measurement (not shown).

The balance further includes measurement means for measuring movement of the movable end 6. The measurement means includes uprights 16, in the current embodiment four uprights 16. The uprights 16 are fixed to the fixed end through mounting plate 4 with bolts 17. Each upright 16 includes protrusions 18 with indentations at the upper corner thereof for seating a horizontal Bragg grated optical fiber 20. The strain in Bragg grated optical fibers may be determined by measuring the change in Bragg wavelength in the fiber 20. The fibers 20 are engaged between protrusions 18 extending from the upright 16 and protrusions 19 extending from the mounting plate 7 and which also have an indentation for seating the fiber 20 at a corner thereof. Relative movement between protrusions 18 of an upright 16 and one of the protrusions 19 will induce deformation and strain in the fiber 20 which may be measured by suitable equipment (not shown) connected thereto. From these measurements the lateral movement of the mounting plate 7, which include the axial force, side force (horizontal forces) and yawing moment, may be mathematically deduced. Similarly, a vertical fiber 21 between indented protrusion 22 and indented protrusion 23 may be used to determine the normal force (vertical force), pitching moment and rolling moment of the mounting plate 7. The measurements taken from the fibers of opposing uprights 16 are complementary in the sense that when a fiber on one upright 16 is in tension, the fiber on the opposing upright will be in compression.

The balance 1 has four supports 9 located operatively at the corners of the mounting plates (4 and 7). Each support 9 has a first end 11 and a second end 10. The first end 11 is fixed to the fixed end 3 by press-fitting and/or welding to the mounting plate 4. Similarly, the second end 10 is fixed to the movable end 6 by press-fitting and/or welding to the mounting plate 7. Each support 9 further has a support structure 13 between the first and second ends (11 and 10). The support structure 13 compensates for resultant movements caused by lateral movement of the second end 10 relative to the first end 11. The structure 13 includes a first support member 12 which extends from the first end 11, a second support member 14 extending from the second end 10, and an intermediate member 15 between the first support member 12 and the second support member 14. In the current embodiment, the structure 13 further includes a third support member 26 which extends from the second end 10, and an intermediate member 27 between the third support member 26 and the first support member 12. The additional members (26 and 27) are shorter and compensate for relative movements in a direction transverse to members (14 and 15). The first support member 12 has a flexure 24 and the third support member 26 has a flexure 28, which reduces the first and third support member's (12 and 26) resistance to flexing in one direction, and the second support member has a flexure 25 which reduces the member's 14 resistance to flexing in a second direction which is transverse in the lateral plane to the first direction. The support member includes biasing means, in the current embodiment being the support member's natural elastic deformation, which biases the members (12, 14, 15, 26, and 27) such that lateral movement of the second end 10 causes partially opposing relative longitudinal movement between the first 12 and intermediate (15 and 27) members. The opposing relative movement is opposite and equal between the first and intermediate members, neutralizing relative longitudinal movement between the second end 10 and the first end 11 caused by lateral movement of the second end 10. This allows the mounting plate 7 to move laterally under pure lateral force without inherent longitudinal movement associated with the later movement in a simple support structure.

The first 12, second 14, third 26 and intermediate (15 and 27) members are integrally formed and the relative lateral movement of the first support member 12 and the intermediate (15 and 27) members and the biasing between the members are caused by the flexing of the members (12, 14, 15, 26 and 27). The support members and the ends are also integrally formed. The members are shaped and sized such that lateral movement of the second end causes flexing of the members and the flexing causes proportionally opposing longitudinal movement of portions thereof. Lateral movement of the second end 10 causes movement of the first support member 12 relative to the fixed end and movement of the intermediate member 15 relative to the first member 12, and movement of the intermediate member 27 relative to the first member 12.

It is envisaged that the invention will provide a force and moment balance, and support therefor, which allows the movable end to move laterally under lateral force compensating for resultant non-lateral movements through the support structure. It is further envisioned that the force and moment balance will decrease the required complexity for calibration thereof.

The invention is not limited to the precise details as described herein. For example, instead of using the force and moment balance for wind tunnel measurements, the balance may be used to measure cutting forces on machining tools. Further, instead of having the support and intermediate members integrally formed, the support and intermediate members may be separately formed and biased to neutralize resultant movements of the moveable end.

The invention claimed is:

1. A support for a force and moment balance comprising:
   a first end and a second end; and
   a support structure between the ends;
   the support structure including:
   a first support member extending from the first end toward the second end, the first support member having a fixed end and a free end, the fixed end being connected to the first end of the support, and the free end being spaced apart from the second end of the support;
   a second support member extending from the second end toward the first end, the second support member having a fixed end and a free end, the fixed end being connected to the second end of the support, and the free end being spaced apart from the first end of the support;
   a first intermediate member between the first and second support members, the first intermediate member having a first free end and a second free end, the first free end of the first intermediate member being connected to the free end of the first support member and spaced apart from the second end of the support, and the second free end of the first intermediate member being connected to the free end of the second support member and spaced apart from the first end of the support; and
   whereby lateral movement of the second end causes relative movement between the first support member, the first intermediate member, and the second support member, and neutralizes relative longitudinal movement between the second end and the first end.

2. The support of claim 1 wherein the first end is fixed and the second end is movable.

3. The support of claim 1 wherein the relative movement between the first support member, the first intermediate member, and the second support member is opposite and equal.

4. The support of claim 1 wherein (A) the first support member, the second support member, and the first intermediate member are integrally formed, and (B) the relative movement between the first support member, the second support member, and the first intermediate member and biasing between the first support member, second support member, and the first intermediate member are caused by flexing of the members.

5. The support of claim 1 wherein the first support member, second support member, the first intermediate member, the first end, and the second end are integrally formed.

6. The support of claim 4 wherein the members are shaped and sized such that lateral movement of the second end causes flexing of the first support member, the second support member, and the first intermediate member, and the flexing of the first support member, the second support member, and the first intermediate member causes proportionally opposing longitudinal movement between the second end and the first end.

7. The support of claim 2 wherein lateral movement of the movable end causes movement of the first support member relative to the fixed end and movement of the first intermediate member relative to the first member to neutralize relative longitudinal movement between the movable end and the fixed end.

8. A force and moment balance comprising:
a fixed end and a movable end; and
a number of supports between the fixed and movable ends;
wherein each support between the fixed and movable ends is defined by:
a first end and a second end;
a first support member extending from the first end toward the second end, the first support member having a fixed end and a free end, the fixed end being connected to the first end of the support, and the free end being spaced apart from the second end of the support;
a second support member extending from the second end toward the first end, the second support member having a fixed end and a free end, the fixed end being connected to the second end of the support, and the free end being spaced apart from the first end of the support;
an first intermediate member between the first and second members, the first intermediate member having a first free end and a second free end, the first free end of the first intermediate member being connected to the free end of the first support member and spaced apart from the second end of the support, and the second free end of the first intermediate member being connected to the free end of the second support member and spaced apart from the first end of the support.

9. The force and moment balance of claim 8 wherein the supports are integrally formed with the balance.

10. The force and moment balance of claim 8 wherein the force and moment balance further comprises an upright fixed to the fixed end, wherein the upright includes measurement means for measuring movement of the movable end.

11. The force and moment balance of claim 8 wherein the measurement means includes optical fibers.

12. The force and moment balance of claim 11 wherein the optical fibers includes a selective wavelength filter.

13. The force and moment balance of claim 11 wherein the optical fibers includes a selective wavelength reflector.

14. The force and moment balance of claim 13 wherein the reflector is a Bragg reflector.

15. The support of claim 1, further comprising:
a third support member extending from the second end toward the first end, the third support member having a fixed end and a free end, the fixed end being connected to the second end of the support, and the free end being spaced apart from the first end of the support; and
a second intermediate member between the first and third support members, the second intermediate member having a first free end and a second free end, the first free end of the second intermediate member being connected to the free end of the first support member and spaced apart from the second end of the support, and the second free end of the second intermediate member being connected to the free end of the third support member and spaced apart from the first end of the support;
wherein the fixed end of the third support member is connected to the second end of the support at a point opposite the fixed end of the second support member.

16. The support of claim 15, wherein the third support member and the second intermediate member are shorter than the first support member and the first intermediate member.

* * * * *